US012365107B2

(12) United States Patent
Donaghy

(10) Patent No.: US 12,365,107 B2
(45) Date of Patent: Jul. 22, 2025

(54) FOOD PROCESSING APPARATUS

(71) Applicant: Donaghy Engineering Ltd, Dungannon (GB)

(72) Inventor: Stephen Donaghy, Dungannon (GB)

(73) Assignee: Donaghy Engineering Ltd, Dungannon (GB)

( * ) Notice: Subject to any disclaimer, the term of this patent is extended or adjusted under 35 U.S.C. 154(b) by 197 days.

(21) Appl. No.: 17/421,871

(22) PCT Filed: Dec. 20, 2019

(86) PCT No.: PCT/EP2019/086643
§ 371 (c)(1),
(2) Date: Jul. 9, 2021

(87) PCT Pub. No.: WO2020/151893
PCT Pub. Date: Jul. 30, 2020

(65) Prior Publication Data

US 2022/0105650 A1 Apr. 7, 2022

(30) Foreign Application Priority Data

Jan. 23, 2019 (GB) ..................................... 1900935

(51) Int. Cl.
*B26D 3/26* (2006.01)
*B26D 1/00* (2006.01)
(Continued)

(52) U.S. Cl.
CPC .................. *B26D 3/26* (2013.01); *B26D 1/11* (2013.01); *B26D 1/12* (2013.01); *B26D 1/34* (2013.01);
(Continued)

(58) Field of Classification Search
CPC .... B26D 3/11; B26D 2001/0073; B26D 3/26; B26D 2210/02; B26D 1/11; B26D 1/12; B26D 1/34; A21C 11/106; B26F 1/44
(Continued)

(56) References Cited

U.S. PATENT DOCUMENTS 3,279,397 A 10/1966 Swett et al.
3,667,519 A * 6/1972 Shadduck ................. B26B 3/04
30/316
(Continued)

FOREIGN PATENT DOCUMENTS

CN 101875201 A 11/2010
CN 206687113 U 12/2017
(Continued)

OTHER PUBLICATIONS

Screen captures from YouTube video clip entitled "Play-Doh Fun Factory," 7 pages, uploaded on Mar. 15, 2014 by user "MoneySavingVideos". Retrieved from Internet: <https://www.youtube.com/watch?v=WIQq8QXd1-k>. (Year: 2014).*
(Continued)

*Primary Examiner* — Evan H MacFarlane
(74) *Attorney, Agent, or Firm* — Tucker Ellis LLP; Michael G. Craig

(57) ABSTRACT

A food processing apparatus for the cutting of foodstuff comprising a first cutter having a cross/sectional shape defining a first maximal external diameter and a first minimal internal diameter about a first central axis. A second cutter having a cross-sectional shape defining a second maximal external diameter and a second minimal internal diameter about a second central axis is also provided. The second maximal external diameter of the second cutter is greater than or equal to the first minimal internal diameter of the first cutter. In use, the foodstuff is cut by the second
(Continued)

cutter before being cut by the first cutter, or alternatively the first cutter may make the first cut with the second cutter making a second subsequent cut.

1 Claim, 10 Drawing Sheets

(51) Int. Cl.
*B26D 1/11* (2006.01)
*B26D 1/12* (2006.01)
*B26D 1/34* (2006.01)
*B26D 3/11* (2006.01)

(52) U.S. Cl.
CPC ........ *B26D 3/11* (2013.01); *B26D 2001/0073* (2013.01)

(58) Field of Classification Search
USPC .................................. 30/316, 301, 315, 299
See application file for complete search history.

(56) References Cited

U.S. PATENT DOCUMENTS

| | | | |
|---|---|---|---|
| 4,681,000 | A | 7/1987 | Wolters |
| 4,789,555 | A | 12/1988 | Judd |
| 5,791,837 | A | 8/1998 | Johnson |
| 6,955,110 | B1 | 10/2005 | Spletzer et al. |
| 2007/0264418 | A1 | 11/2007 | Young et al. |
| 2011/0283548 | A1 | 11/2011 | White |
| 2014/0220169 | A1 | 8/2014 | Lion et al. |
| 2016/0016326 | A1 | 1/2016 | Walker et al. |
| 2018/0361606 | A1 | 12/2018 | Banowetz et al. |

FOREIGN PATENT DOCUMENTS

| | | | |
|---|---|---|---|
| DE | 1601852 | U | 2/1950 |
| DE | 202010003494 | U1 | 6/2010 |
| IN | 201120628 | Y | 9/2008 |

OTHER PUBLICATIONS

PCT International Search Report and the Written Opinion of the International Searching Authority to corresponding Great Britain Patent Application No. PCT/EP2019/086643, dated Apr. 24, 2020, 8 pages.

Great Britain Combined Search and Examination Report under Sections 17 & 18(3) corresponding to GB Patent Application No. GB1900935.6, dated Aug. 5, 2019, 7 pages.

Great Britain Combined Search and Examination Report under Sections 17 & 18(3) corresponding to GB Patent Application No. GB2107970.2, dated Jun. 23, 2021, 7 pages.

* cited by examiner

FOOD PROCESSING APPARATUS

RELATED APPLICATION DATA

This application is a national phase application of International Application No. PCT/EP2019/086643, filed Dec. 20, 2019, which claims priority to GB1900935.6, filed Jan. 23, 2019, which is hereby incorporated herein by reference.

FIELD OF THE INVENTION

This invention relates to a food processing apparatus, and in particular to an apparatus for cutting foodstuff into predetermined shapes and sizes.

BACKGROUND OF THE INVENTION

It is often desirable to shape or size items of food in order that they are more easily consumed, more palatable, can be processed more easily, or are just more aesthetically pleasing. In the most basic sense this can be achieved by simply manually slicing a food item, such as a vegetable item, to create the desired shape or size. Whilst this is suitable for simple shapes and low volume, for more complicated shapes or higher volume applications, manual cutting is not practical.

Devices exist which automate the process of shaping and sizing, for example, vegetables. These devices come in a variety of forms. One such device comprises a grid like cutting implement, the vegetable being forced through the grid with the aid of an attached lever or ram, slicing the vegetable along the gridlines. Other implements mount the vegetable therein and utilise a spinning motion to shear a portion of the outer surface creating a spiral shaped portion of vegetable. There also exists commercial devices comprising a drum into which a plurality of vegetable items are placed, the drum having an opening to a blade and rotating such that portions of the vegetables become exposed to the aperture and the blade and are sliced. The shape of the vegetable in this case being determined by the configuration of the aperture and the blade.

What all of the current devices have in common is a limitation on the shape which can be created from the food item. Simply forcing a vegetable through a two dimensional die or grid, or removing generally parallel slices from a food item limits the variety of shape that can be produced.

It is the object of the present invention to provide for the shaping and sizing of foodstuff in a manner which provides flexibility in terms of the shapes that may be created.

SUMMARY OF THE INVENTION

According to the invention there is provided a food processing apparatus for the cutting of foodstuff comprising: a first cutting means having a cross-sectional shape defining a first maximal external diameter and a first minimal internal diameter about a first central axis; a second cutting means having a cross-sectional shape defining a second maximal external diameter and a second minimal internal diameter about a second central axis, the second maximal external diameter of the second cutting means being greater than or equal to the first minimal internal diameter of the first cutting means.

Ideally, in use, the second cutting means makes an initial cut in the foodstuff before a subsequent cut is made by the first cutting means.

Alternatively, in use, the first cutting means makes the initial cut in the foodstuff before the subsequent cut is made by the second cutting means.

Advantageously, two cuts can be made which produce a one piece, three dimensional basket/grid/mesh effect.

Further advantageously, as a result of the relationship between the second maximal external diameter of the second cutting means and the first minimal internal diameter of the first cutting means, the first and second cuts overlap such that apertures in a side wall of a portion of cut foodstuff may be formed.

Preferably, the first and or second cutting means have a non-uniform cross-sectional shape.

Ideally, the first cutting means is an outer cutting means.

Preferably, the second cutting means is an inner cutting means.

Ideally, the initial cut is made in the foodstuff by the first or second cutting means forming a preliminary shape in the foodstuff, the preliminary shape having a central axis defined by the central axis of the cutting means used to make the initial cut.

Preferably, the preliminary shape is subsequently cut by the one of the first or second cutting means not utilised to make the initial cut, the subsequent cut being in a direction such that the central axis of the preliminary shape aligns with the central axis of the cutting means making the subsequent cut during the cutting operation.

Ideally, the initial and subsequent cuts are at least partially overlapping cuts.

Preferably, cutting of the preliminary shape forms a final shape having a basket, grid, or mesh effect.

Ideally, the first and/or second cutting means comprise a plurality of helical cutting formations formed around their respective central axis.

Ideally, the first and/or second cutting means comprise a hollow central portion defined by a plurality of helical cutting formations formed around their respective central axis.

Preferably, the helical cutting formations are formed radially around the central axis of the first and second cutting means.

Preferably, the first and second cutting means are first and second cutting cylinders, the cross sectional shape of which is defined by the helical cutting formations.

Ideally, the first and second cutting means comprise a first and second cutting blades respectively, locatable at respective leading edges thereof.

Preferably, the first and second cutting means extend from the respective leading edges thereof to respective trailing edges thereof forming the respective first and second cutting cylinders.

Preferably, the helical cutting formations encourage rotation of the foodstuff and/or the cutting means as the foodstuff is cut by the cutting means.

Ideally, the first and second cutting means rotate in opposing directions as they travel through the foodstuff, or as the foodstuff travels through said cutting means.

Ideally, the direction of sweep of the helical cutting formations of the first cutting means is oblique in relation to, or opposes, the direction of sweep of the helical cutting formations of the second cutting means.

Preferably, the sweep of helical cutting formations of the first and/or second cutting means is orientated at an angle of between 30 degrees and 60 degrees relative to the axial direction of the respective cutting means.

Ideally, the second maximal external diameter of the second cutting means is greater than the first minimal internal diameter of the first cutting means.

Preferably, the difference between the diameter of the second maximal external diameter of the second cutting means and the diameter of the first minimal internal diameter of the first cutting means is between 0 mm and 4 mm inclusive.

Ideally, the helical cutting formations comprise wedge shaped, square, rectangular, or rounded cutting formations.

Preferably, the helical cutting formations comprise cutting formations of wedge shaped, rectangular, square, or rounded cross-sectional shape.

Preferably, one or more surfaces of the helical cutting formations are tapered and/or swept such that foodstuff is encouraged to move at least partially through the cutting means.

Ideally, the first and/or second cutting means are mountable such that they are freely rotatable about their central axis.

Alternatively, the first and/or second cutting means are rotationally driven by cutter driving means about their central axis.

Further alternatively, the first and/or second cutting means are rotationally fixed and the foodstuff rotates as it is cut thereby.

Preferably, the foodstuff is freely rotatable as it moves through the cutting means.

Alternatively, the foodstuff is rotationally driven by foodstuff driving means.

Further alternatively, the foodstuff is rotationally fixed and the first and second cutting means rotate as they cut the foodstuff.

Ideally, the first and second cutting means are forced at least partially through the foodstuff.

Alternatively, the foodstuff is forced at least partially through the first and second cutting means.

Further alternatively, the first and second cutting means and the foodstuff are forced towards one another such that the foodstuff is forced at least partially through the first and second cutting means.

Preferably, the first and second cutting means cut completely through the foodstuff.

Alternatively, the first and second cutting means cut partially through the foodstuff and may be rotated and/or otherwise moved in a direction opposite to a cutting direction such that they can be removed from the partially cut foodstuff.

Preferably, the cutting direction is the direction in which the first and/or second cutting means travels through the foodstuff as the leading edge penetrates the foodstuff and travels therethrough to form a cut therein.

Ideally, axial movement or rotation of the first and/or second cutting means encourages passage of the foodstuff at least partially therethrough, and/or axial movement or rotation of the foodstuff encourages passage of the foodstuff at least partially through the first and/or second cutting means.

Preferable, the first and/or second cutting means comprise a cutting means mounting assembly.

Ideally, the first cutting means is mountable via mounting features extending from an outer surface thereof.

Alternatively, the first cutting means is mounted via mounting brackets, a mounting plate, or mounting tube means extending from proximal the leading or trailing edges of the first cutting means.

Ideally, the second cutting means is mountable via a central axle or shaft which is coaxial with the central axis of the second cutting means.

Alternatively, the second cutting means is mounted via mounting brackets or a mounting plate extending from proximal the leading or trailing edges of the second cutting means.

Further alternatively, the second cutting means is not fixed/mounted and is forced through the foodstuff in a freely rotating manner.

Ideally, where the second cutting means is not fixed/mounted it may pass completely through and exit the foodstuff, and be reset such that it is ready to cut another portion of foodstuff.

According to a second aspect of the invention there is provided an item of food processing plant or machinery comprising a food processing apparatus, the food processing apparatus further comprising a first cutting means having a cross-sectional shape defining a first maximal external diameter and a first minimal internal diameter about a first central axis; a second cutting means having a cross-sectional shape defining a second maximal external diameter and a second minimal internal diameter about a second central axis, the second maximal external diameter of the second cutting means being greater than or equal to the first minimal internal diameter of the first cutting means.

According to a third aspect of the invention there is provided a cutting means for a food processing apparatus, the cutting means comprising a plurality of helical cutting formations formed around a central axis.

According to a fourth aspect of the invention there is provided a method for processing foodstuff, the method comprising the steps of: making an initial cut in the foodstuff using a first or second cutting means forming a preliminary shape in the foodstuff, the preliminary shape having a central axis defined by the central axis of the cutting means used to make the initial cut, wherein the preliminary shape is subsequently cut by the one of the first or second cutting means not utilised to form the preliminary shape, the subsequent cut being in a direction such that the central axis of the preliminary shape aligns with the central axis of the cutting means making the subsequent cut during the cutting operation.

Ideally, the initial cut and the subsequent cut are at least partially overlapping.

According to a fifth aspect of the invention, there is provided a food processing apparatus for the cutting of foodstuff comprising: a first cutting means having a cross-sectional shape defining a first maximal external diameter and a first minimal internal diameter about a first central axis; a second cutting means having a cross-sectional shape defining a second maximal external diameter and a second minimal internal diameter about a second central axis, the second maximal external diameter of the second cutting means being less than or equal to the first minimal internal diameter of the first cutting means.

BRIEF DESCRIPTION OF THE DRAWINGS

An embodiment of the invention is now described by way of example and with reference to the accompanying drawings in which.

DETAILED DESCRIPTION OF THE DRAWINGS

The present teaching will now be described with reference to an exemplary food processing apparatus for the cutting of foodstuff. It will be understood that the exemplary food processing apparatus is provided to assist in an understanding of the present teaching and are not to be construed as limiting in any fashion. Furthermore, elements or components that are described with reference to any one Figure may be interchanged with those of other Figures or other equivalent elements without departing from the spirit of the present teaching.

Figure 26:
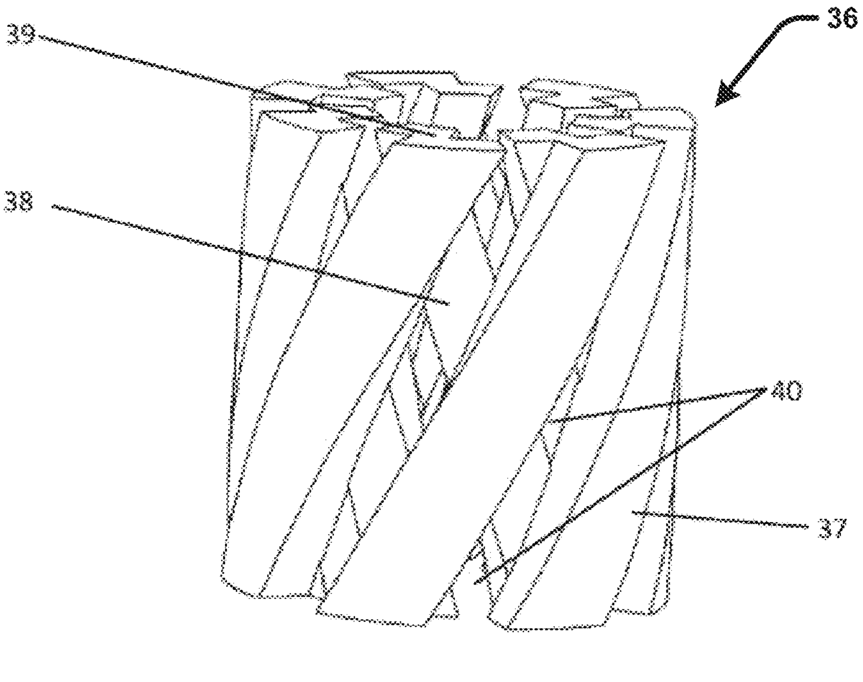
FIG. 26 is a portion of foodstuff after processing by the food processing apparatus.

Referring now to the accompanying drawings, there is illustrated a food processing apparatus for the cutting of foodstuff comprising a first cutter 11 (Hereinafter reference numeral 11 refers generally to reference numbers 11, 11*a*, 11*b*, 11*c*, and 11*d* showing different versions in the FIGURES) having a cross-sectional shape defining a first maximal external diameter 12 and a first minimal internal diameter 13 about a first central axis 14. A second cutter 15 (Hereinafter reference numeral 15 refers generally to reference numbers 15*a*, 15*b*, 15*c*, and 15*d* showing different versions in the FIGURES) having a cross-sectional shape defining a second maximal external diameter 16 and a second minimal internal diameter 17 about a second central axis 18 is also provided. The second maximal external diameter 16 of the second cutter 15 is greater than or equal to the first minimal internal diameter 13 of the first cutter 11. In use, the foodstuff is cut by the second cutter 15 before being cut by the first cutter 11, or alternatively the first cutter 11 may make the first cut with the second cutter 15 making a second subsequent cut. The sizing of the cutters 11, 15 results in the first cutter 11 forming an outer cutter 11 and the second cutter 15 forming an inner cutter 15, the inner and outer cutters 11, 15 making respective inner and outer cuts in the foodstuff relative to each other. In a preferable embodiment, the second maximal external diameter 16 of the second cutter 15 is greater than the first minimal internal diameter 13 of the first cutter 11. In a most preferred embodiment, the difference between the diameter of the second maximal external diameter of the second cutter 15 and the diameter of the first minimal internal diameter of the first cutter 11 means is between 0 mm and 4 mm inclusive. However, it should be understood that this range is provided for example only and the invention is easily scalable to facilitate cutting of larger or smaller items of foodstuff and as such the differences in the aforementioned diameters may be any reasonable value given the scale of the cuts formed. Advantageously, two cuts can be made which produce a one piece, three dimensional basket/grid/mesh effect 36, the apertures 40 in the basket/grid/mesh 36 being formed by the overlapping nature of the cuts, this overlapping being caused by the maximal external diameter 16 of the second cutter 15 being greater than the first minimal internal diameter 13 of the first cutter 11. In the most typical case, the foodstuff is potato, however the skilled person would appreciate that the food processing apparatus could be used to cut any type of foodstuff having suitable solidity including but not limited to vegetables and fruit. In one example of use of the apparatus, the foodstuff is cut by the first cutter 11 forming a preliminary shape in the foodstuff, the preliminary shape having a central axis defined by the central axis 14 of the first cutter 11. The preliminary shape is then subsequently cut by the second cutter 15 in a direction such that the central axis of the preliminary shape aligns with the central axis 18 of the second cutter 15 during the cutting operation. Essentially, this means that both the first and second cutters 11, 15 cut the foodstuff along a common axis. Cutting of the preliminary shape by the second cutter 15 forms a final shape 36 having a basket, grid, or mesh effect. This alignment of axis during cutting ensures that an exterior wall of a final shape formed after cutting by both cutters 11, 15 is of the desired thickness and that the two cuts made form the final shape as desired. It can also be seen in FIG. 26 that, as the second maximal diameter 16 of the second cutter 15 is greater than the first minimal diameter 13 of the first cutter 11, the formations 37 formed by the first cutter 11 are integral with the formations 38 formed by the second cutter 15 by virtue of a join 39, yet apertures 40 may still be formed in the walls of the final shape 36. Again, as described above, the apparatus may work equally as well in a manner wherein the second cutter 15 makes the preliminary cut and the first cutter 11 makes the final cut.

In the embodiment shown in the drawings, the first and second cutters 11, 15 comprise a hollow central portion 19, 20 defined by a plurality of helical cutting formations 21, 22 formed around their respective central axis 14, 18. It should be understood that at least the second cutter 15 may not be hollow. Typically, when using a non-hollow/solid second cutter 15, a core will first be cut from the foodstuff into which the solid second cutter 15 may travel. The helical cutting formations 21, 22 are formed radially around the central axis of the first and second cutters 11, 15 in a swept fashion. The first and second cutters 11, 15 form cutting cylinders 11, 15, which extend lengthwise along the central axis 14, 18 of the first and second cutters 11, 15. The cross sectional shape of the cutting cylinders 11, 15 is defined by the helical cutting formations 21, 22. The cross-sectional shape of the cutting cylinders 11, 15 varies along their axial length due to the helical nature of the helical cutting formations 21, 22, however the respective maximal and minimal diameters 12, 13, 16, 17 remain constant along the axial length of the cutting cylinders 11, 15. The first and second cutting cylinders 11, 15 comprise a first and second cutting blades 23, 24 respectively locatable at respective leading edges thereof 25, 26. The first and second cutting cylinders 11, 15 extend axially from the respective leading edges thereof 25, 26 to respective trailing edges 27, 28 thereof. Each helical cutting formation 21, 22 comprise a root 29 which defines the minimal diameter of the respective cutting cylinder 11, 15, and a crest 30 which defines the maximal diameter thereof. The helical cutting formations 21, 22 extend in a swept fashion along the axial length of the cutting cylinders 11, 15 with the direction of the sweep from the leading edge 25, 26 to the trailing edge 27, 28 of the respective cutting cylinder 11, 15 being either clockwise or anti-clockwise about the respective central axis thereof 14, 18. In the embodiment shown in the drawings, the helical cutting formations of the first and second cutting cylinders 11, 15 extend in opposing directions such that should the helical cutting formations 21 of the first cutting cylinder 11 extend in a swept fashion in an anti-clockwise direction about its central axis 14, the helical cutting formations 22 of the second cutting cylinder 15 are configured to extend in a swept fashion in the clockwise direction about the central axis 18 of the second cutting cylinder 15. It should be understood that the first cutting cylinder 11 could have clockwise swept helical cutting formations with the second cutting cylinder 15 having opposing anti-clockwise swept helical cutting formations. These opposing directions of sweep are what create the aesthetically pleasing basket/grid/mesh appearance in the foodstuff once processed by the apparatus. The cutting cylinders 11, 15 comprise respective outer walls 31, 32 defined by the shape of their respective helical cutting formations 21, 22, the outer walls 31, 32 defining the hollow central portions 19, 20 thereof. In the most preferable embodiment, the sweep of helical cutting formations 21 of the cutters 11, 15 are orientated at an angle of between 30 and 60 degrees relative to the axial direction of the respective cutter 11, 15. In the most preferred embodiment the angle of sweep of the first and second cutters 11, 15 is matching.

The helical cutting formations 21, 22 encourage rotation of the foodstuff and/or the cutters 11, 15 as the foodstuff is cut by the cutters 11, 15.

Figure 1:
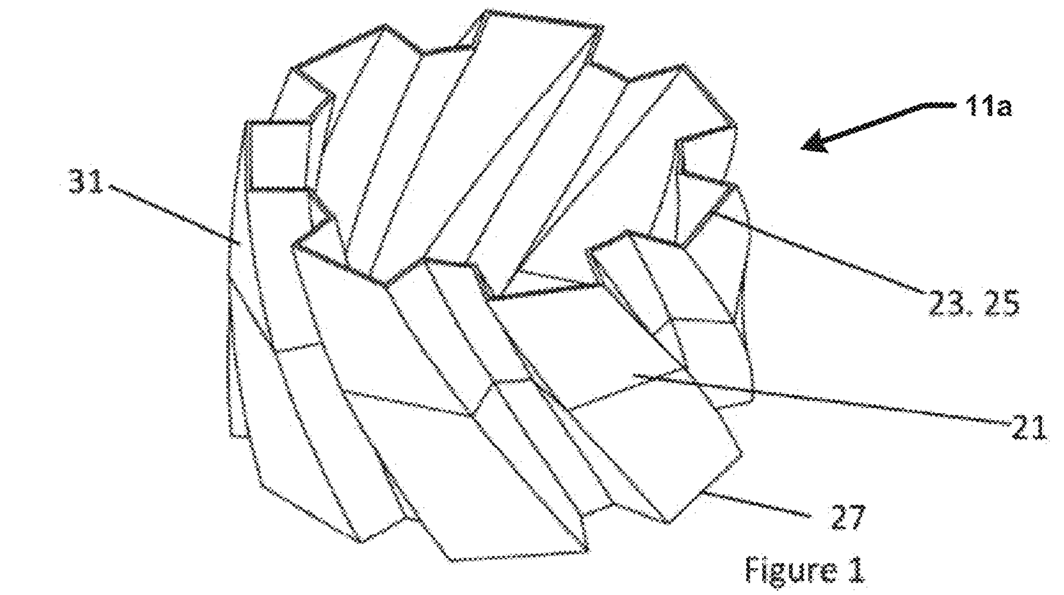
FIG. 1 is a perspective view of a first cutting means of a food processing apparatus comprising seven rectangular helical cutting formations.
Figure 2:
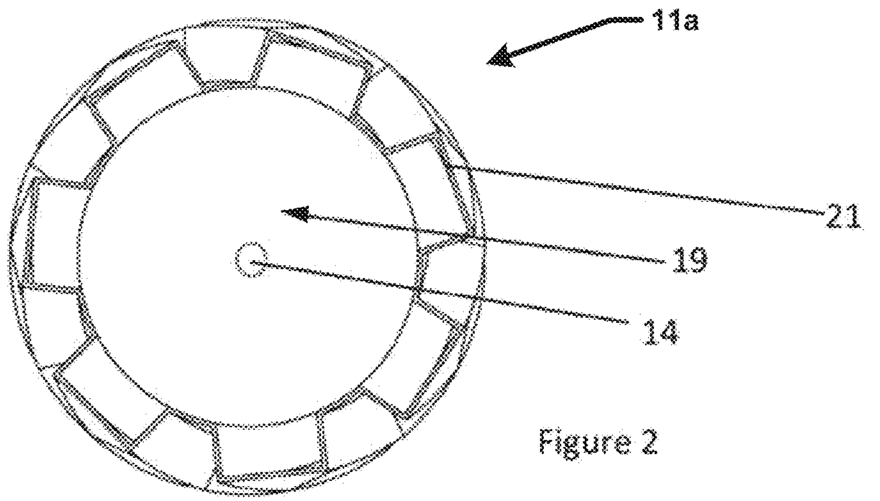
FIG. 2 is a top view of the first cutting means of FIG. 1.
Figure 3:
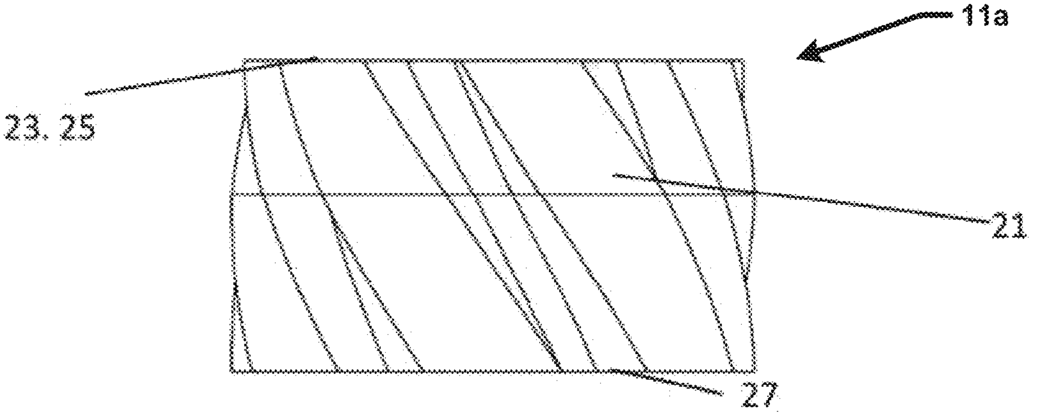
FIG. 3 is a side view of the first cutting means of FIG. 1.
Figure 4:
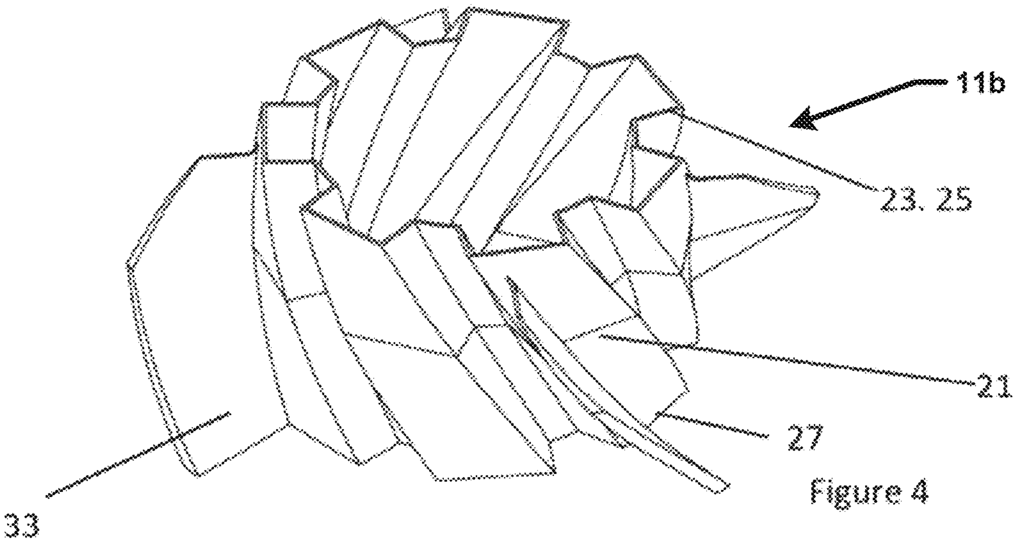
FIG. 4 is a perspective view of a first cutting means of a food processing apparatus comprising seven rectangular helical cutting formations and showing mounting components thereof.
Figure 5:
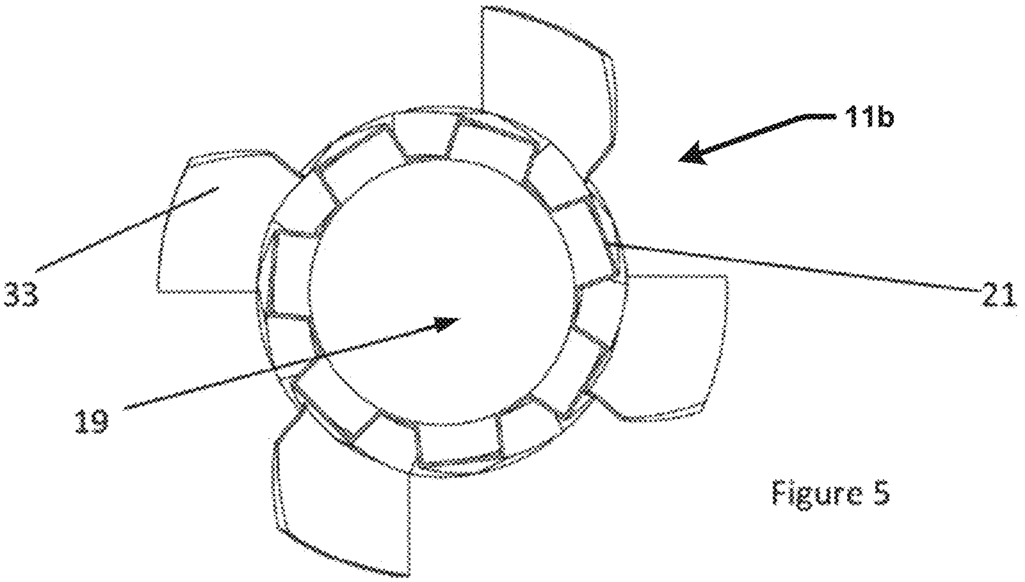
FIG. 5 is a top view of the first cutting means of FIG. 4.
Figure 6:
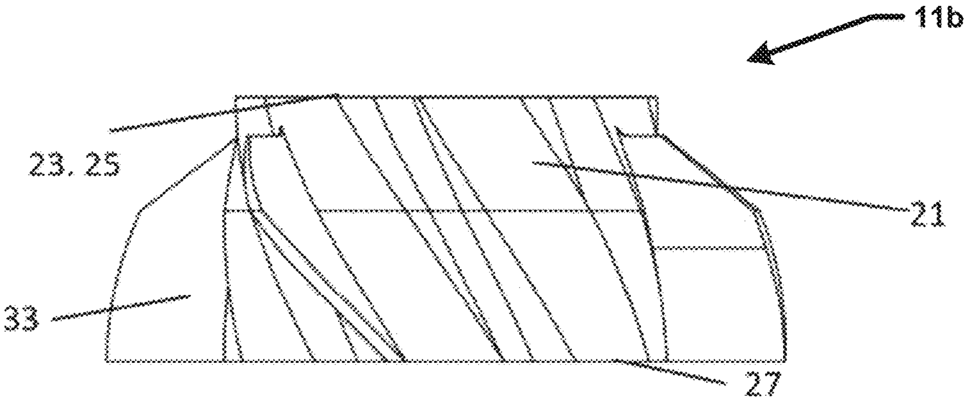
FIG. 6 is a side view of the first cutting means of FIG. 4.
Figure 7:
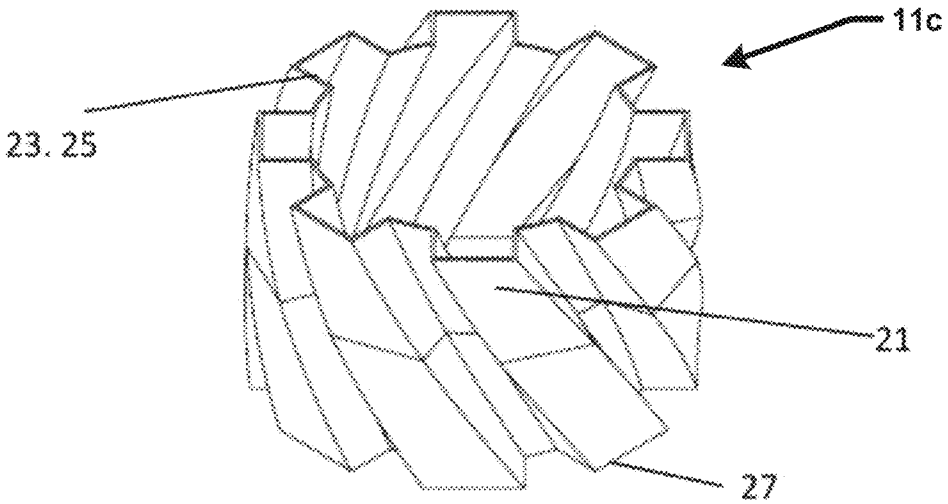
FIG. 7 is a perspective view of a first cutting means of a food processing apparatus comprising eight rectangular helical cutting formations.
Figure 8:
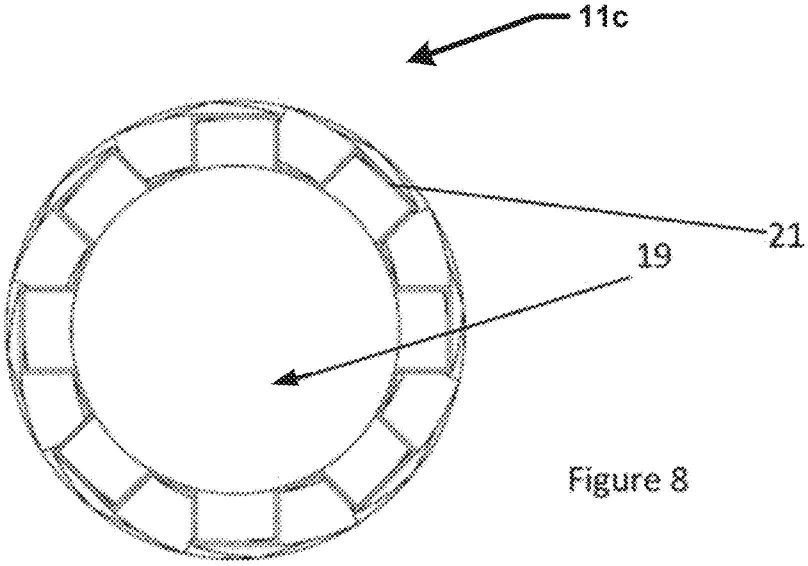
FIG. 8 is a top view of the first cutting means of FIG. 7.
Figure 9:
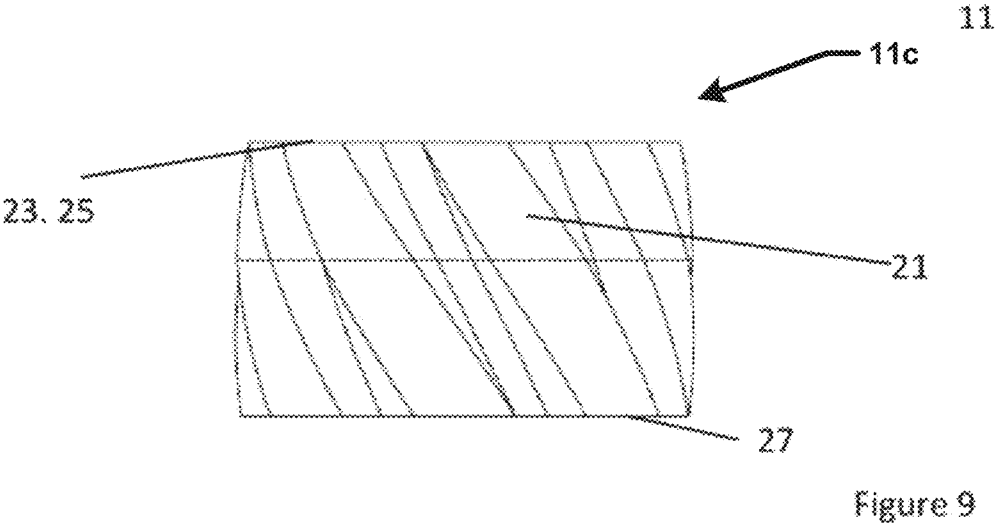
FIG. 9 is a side view of the first cutting means of FIG. 7.
Figure 10:
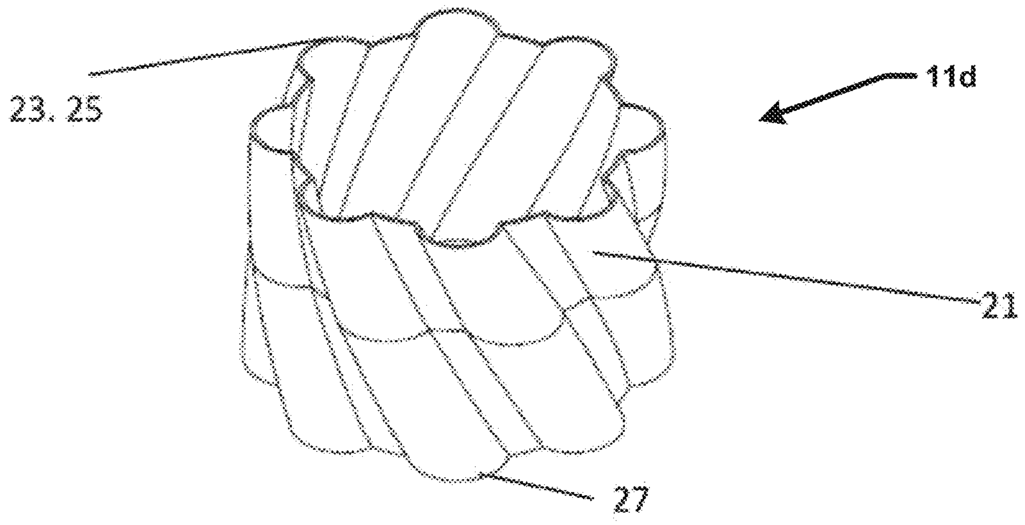
FIG. 10 is a perspective view of a first cutting means of a food processing apparatus comprising eight rounded helical cutting formations.
Figure 11:
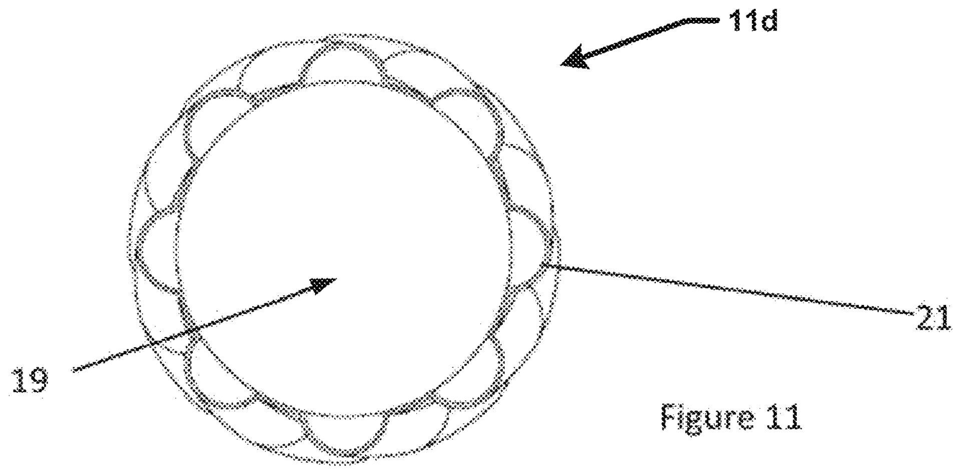
FIG. 11 is a top view of the first cutting means of FIG. 10.
Figure 12:
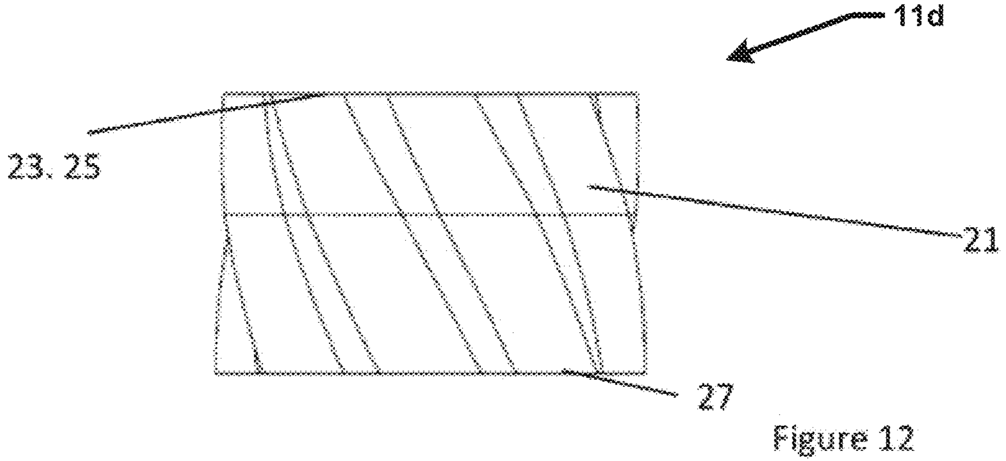
FIG. 12 is a side view of the first cutting means of FIG. 10.
Figure 16:
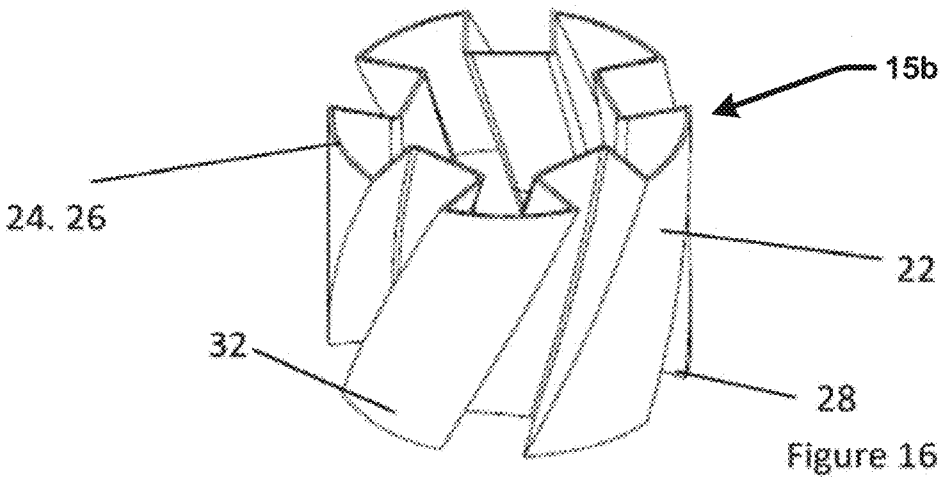
FIG. 16 is a perspective view of a second cutting means of a food processing apparatus comprising five wedge shaped helical cutting formations.
Figure 17:
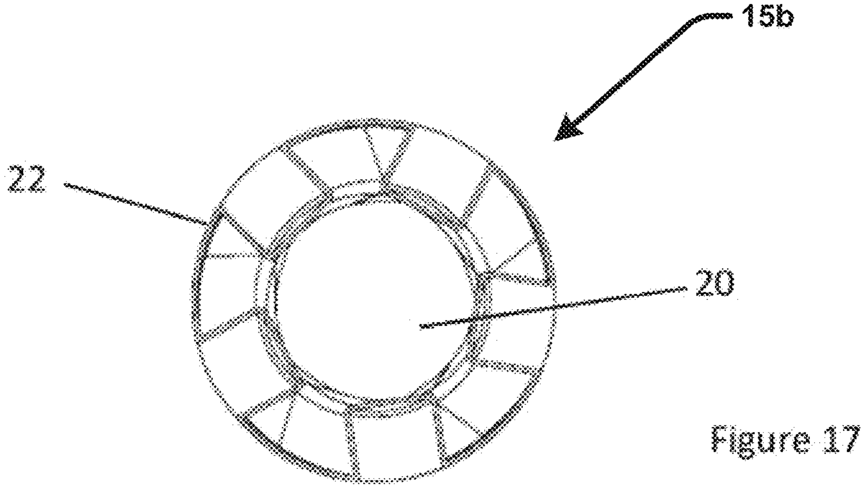
FIG. 17 is a top view of the second cutting means of FIG. 16.
Figure 18:
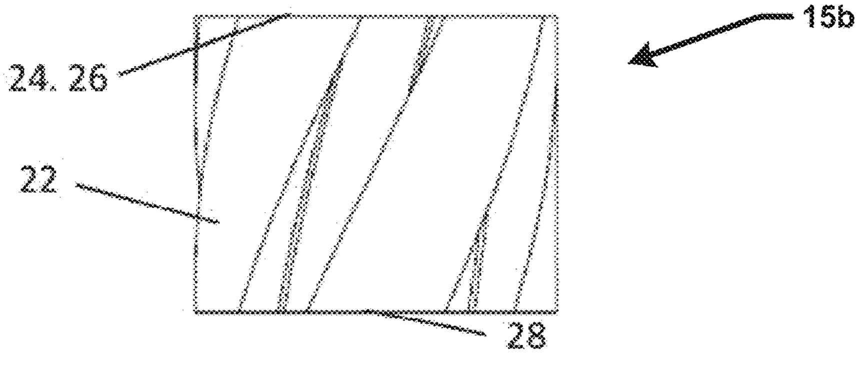
FIG. 18 is a side view of the second cutting means of FIG. 16.
Figure 19:
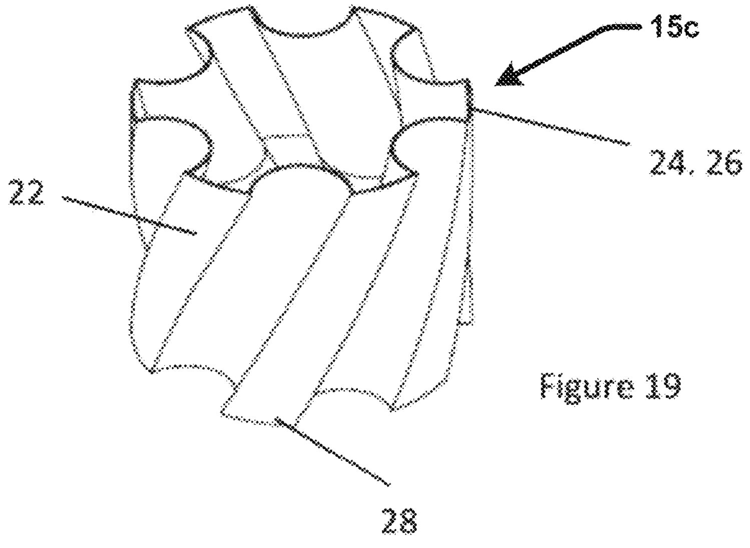
FIG. 19 is a perspective view of a second cutting means of a food processing apparatus comprising six helical cutting formations.
Figure 20:
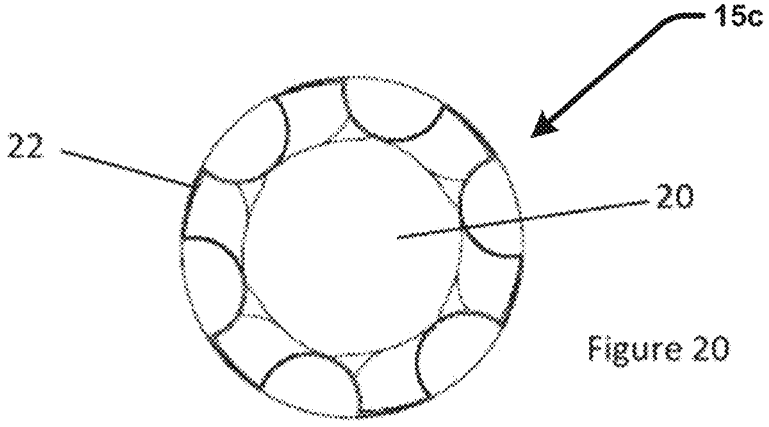
FIG. 20 is a top view of the second cutting means of FIG. 19.
Figure 21:
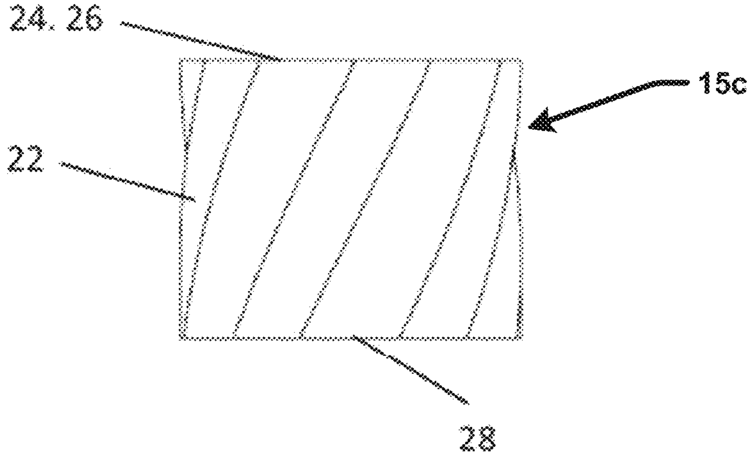
FIG. 21 is a side view of the second cutting means of FIG. 19.
Figure 22:
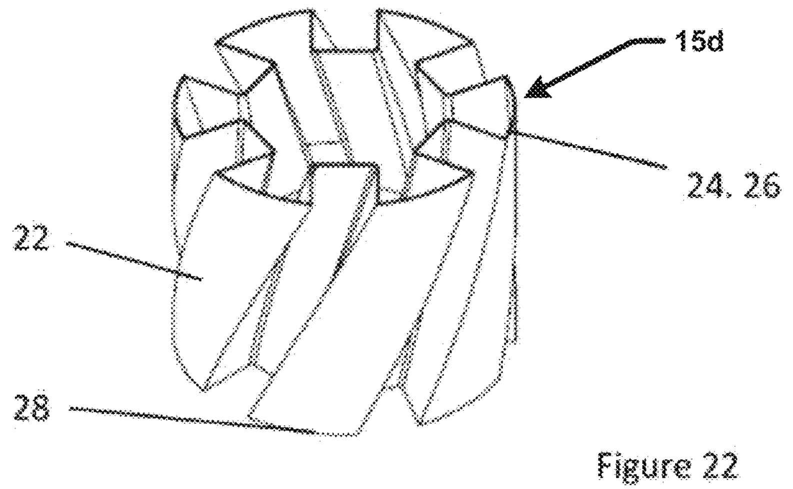
FIG. 22 is a perspective view of a second cutting means of a food processing apparatus comprising six wedge shaped helical cutting formations.
Figure 23:
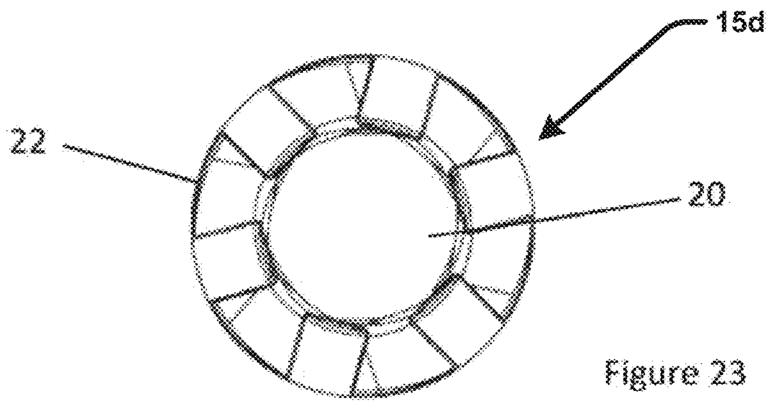
FIG. 23 is a top view of the second cutting means of FIG. 22.
Figure 24:
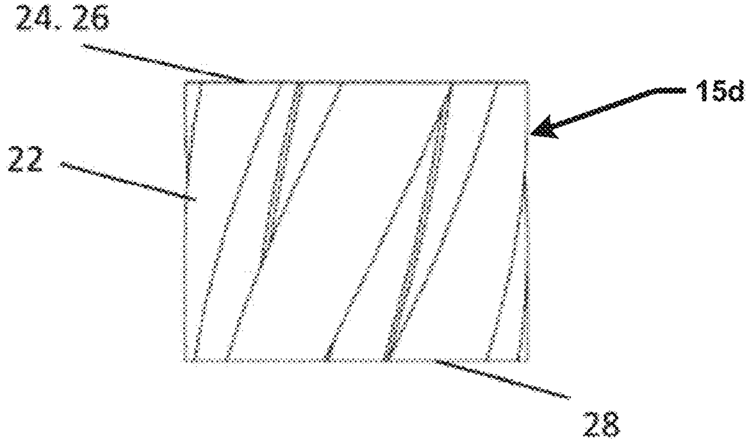
FIG. 24 is a side view of the second cutting means of FIG. 22.
Figure 25A:
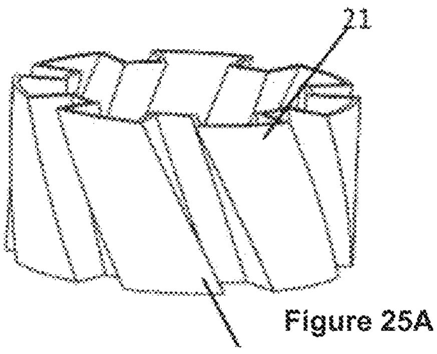
FIGS. 25A, 25B, 25C, and 25D illustrate a comparison of a first cutting means and a second cutting means of a food processing apparatus illustrating the minimal and maximal diameters thereof and the sweep of helical cutting formations thereon.
Figure 25B:
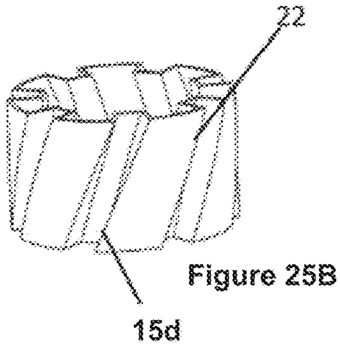
Figure 25C:
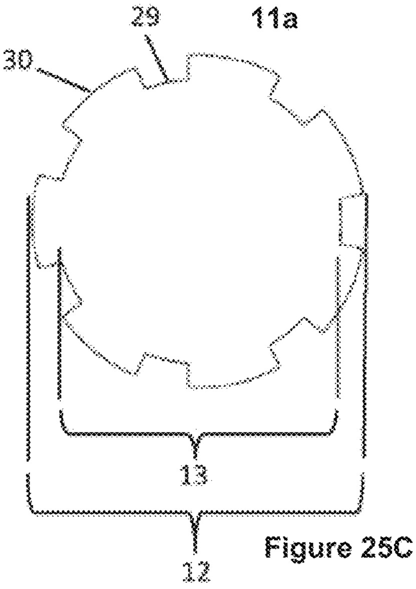
Figure 25D:
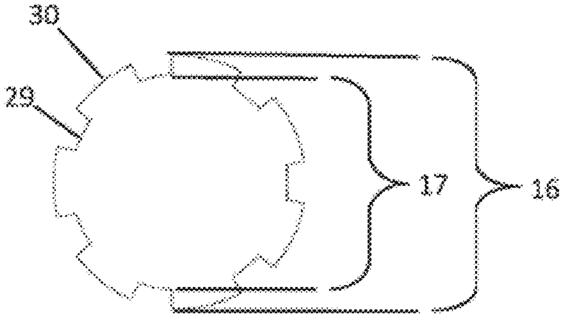

In the embodiments shown in the drawings, the helical cutting formations 21, 22 comprise wedge shaped (see FIG. 16 for example), rectangular (see FIG. 1 for example), or rounded (see FIG. 11 for example) cutting formations. In the embodiment of the drawings, each of the first and second cutters 11, 15 comprises 5 to 8 helical cutting formations 21, 22. It should be noted that the skilled person would understand that various shapes of helical cutting formations could be utilised, including but not limited to rectangular or square cutting formations, without departing from the scope of the invention, and that any reasonable number of helical cutting formations may be utilised on each cutter. Typically, the first cutter 11 will comprise more helical cutting formations 21 than the second cutter 15.

Rotational and or axial movement of the first and/or second cutters 11, 15 encourages passage of the foodstuff at least partially therethrough. Alternatively, or in addition, rotational and/or axial movement of the foodstuff encourages passage of the foodstuff at least partially through the first and/or second cutters 11, 15. In order to cut the foodstuff, the cutters 11, 12, and/or the foodstuff rotates as the foodstuff is cut by the cutters 11, 15. This rotation can be driven or facilitated by a non-driven free rotation. In one embodiment of the apparatus 50, the first and/or second cutters 11, 15 are mountable such that they are freely rotatable about their central axis 14, 18. Alternatively, the first and/or second cutters 11, 15 are rotationally driven by cutter driving arrangement 52 about their central axis 14, 18. The cutter driving arrangement 52 can be a motor or other such suitable driving arrangement in engagement with one or more of the cutters 11, 15 or with components to which the cutters 11, 15 are mounted. In some embodiments, the first and/or second cutters 11, 15 are rotationally fixed and the foodstuff rotates as it is cut thereby. The foodstuff may be freely rotatable as it moves through the cutters 11, 15, or is rotationally driven by a foodstuff driving arrangement. The foodstuff driving arrangement may, for example, comprise a plate to which the foodstuff is mounted, the plate being rotationally driven by a motor or the like. In embodiments where free rotation of the cutters and/or the foodstuff is employed, the sweep of the helical cutting formations 21, 22 causes rotation of the cutters 11, 15 or the foodstuff as the foodstuff travels through the cutters 11, 15.

In addition, in some embodiments, the first and second cutters 11, 15 are forced at least partially through the foodstuff via movement of the first and second cutters 11, 15 in a direction along their central axis 14, 18 with the leading edge 25, 26 thereof being the forward most edge during this movement. In alternative embodiments, the foodstuff is forced at least partially through the first and second cutters 11, 15 via axial movement of the foodstuff towards and into contact with the cutters 11, 15. In a further embodiment, the first and second cutters 11, 15 and the foodstuff are forced in opposing directions towards one another such that the foodstuff is forced at least partially through the first and second cutters 11, 15.

The first and second cutters 11, 15 may, in some embodiments, cut completely through the foodstuff. Alternatively, the first and second cutters 11, 15 cut partially through the foodstuff and may be rotated and/or or otherwise moved in a direction opposite to a cutting direction such that they can be removed from the partially cut foodstuff. The cutting direction is the direction in which the first and/or second cutters 11, 15, travels through the foodstuff as the leading edge penetrates the foodstuff and travels therethrough to form a cut therein. One or both of a reverse rotational and/or axial movement of the cutters 11, 15 and/or the foodstuff may facilitate removal of the cutters 11, 15 from the foodstuff.

Figure 13:
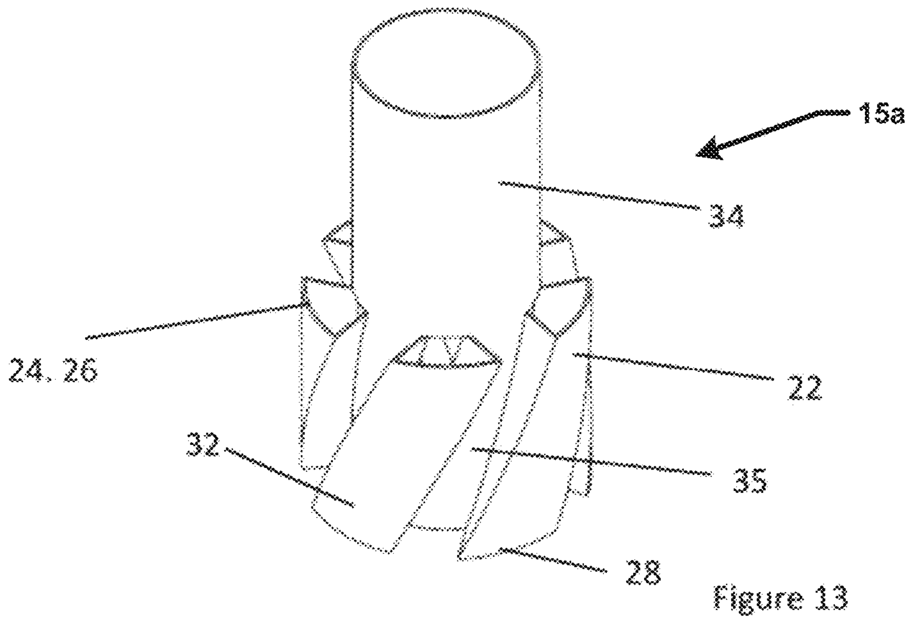
FIG. 13 is a perspective view of a second cutting means of a food processing apparatus comprising five wedge shaped helical cutting formations and a central mounting shaft.
Figure 14:
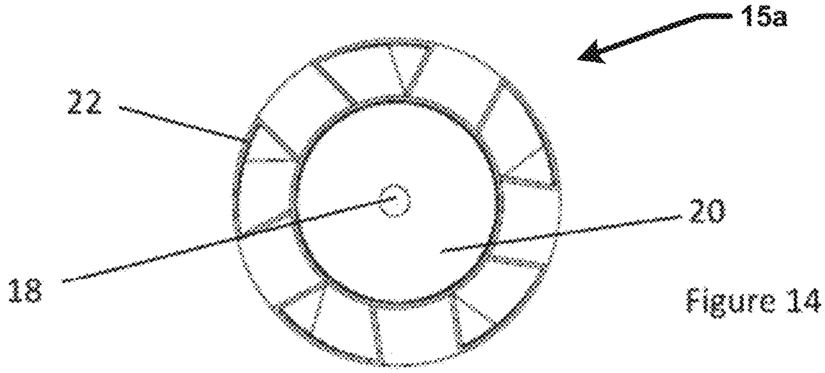
FIG. 14 is a top view of the second cutting means of FIG. 13.
Figure 15:
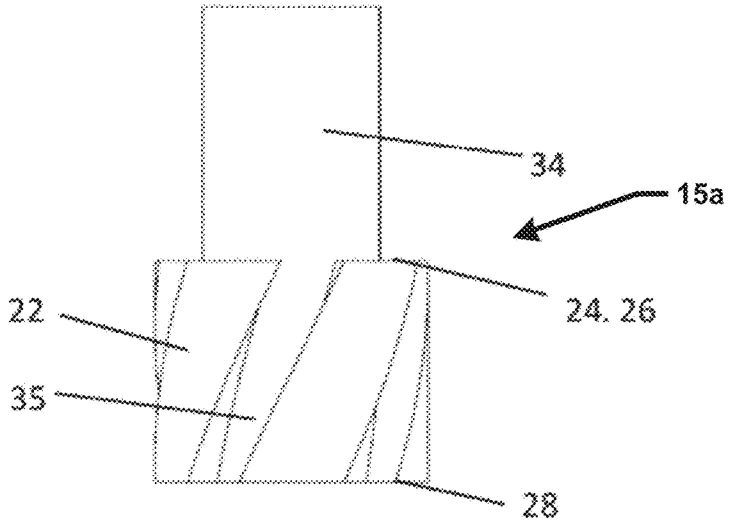
FIG. 15 is a side view of the second cutting means of FIG. 13.

The first and/or second cutters 11, 15 comprise cutter mounting assemblies. In one embodiment, the first cutter 11 is mountable via mounting features 33 extending from an outer surface thereof. In the embodiment shown in the drawings, these mounting features comprise mounting flanges or tabs 33 which may be utilised to mount the cutter 11 and facilitate engagement with a cutter driving arrangement where required. In an alternative embodiment, the first cutter 11 is mounted via mounting brackets, a mounting plate, or a mounting tube extending from proximal the leading 25 or trailing edge 27 of the first cutter. The second cutter 15 is mountable via a central axle or shaft 34 which is coaxial with the central axis of the second cutter 15. In alternative embodiments, the second cutter 15 is mounted via mounting brackets or a mounting plate extending from proximal the leading 26 or trailing edge 28 of the second cutter. In embodiments wherein the cutters 11, 15 are mounted on a central axle or shaft, the helical cutting formations 21, 22 may be formed on or attached to an exterior surface 35 of the shaft, as is best viewed in FIG. 13. In some embodiments, the second cutter 15 is not fixed/mounted and is forced through the foodstuff in a freely rotating manner. IN this case, the second cutter 15 may pass completely through and exit the foodstuff and be reset such that it is ready to cut another portion of foodstuff.

The food processing apparatus as described above may be incorporated into a wider piece of food processing plant or machinery which may comprise further elements designed to process the foodstuff prior to or after processing by the food processing apparatus.

In use, the food processing apparatus may be utilised in a method for processing foodstuff, the method comprising the step of first cutting the foodstuff using the second cutter 15 such that a preliminary shape is formed, the preliminary shape having an outer diameter and an inner diameter. The method further comprising the step of cutting the preliminary shape using a first cutter 11 to form a final shape.

Whilst not as preferable, embodiments may exist wherein the second maximal external diameter of the second cutter 15 is less than or equal to the first minimal internal diameter of the first cutter 11. In this case the cuts formed by the first and second cutters 11, 15 are not overlapping and as such a thin layer of material may be left across the apertures 40 which may be removed in a subsequent processing step. Alternatively, material may be left in the apertures to form a final shape having continuous outer walls.

The invention is not limited to the embodiment(s) described herein but can be amended or modified without departing from the scope of the present invention.

Figure 27:
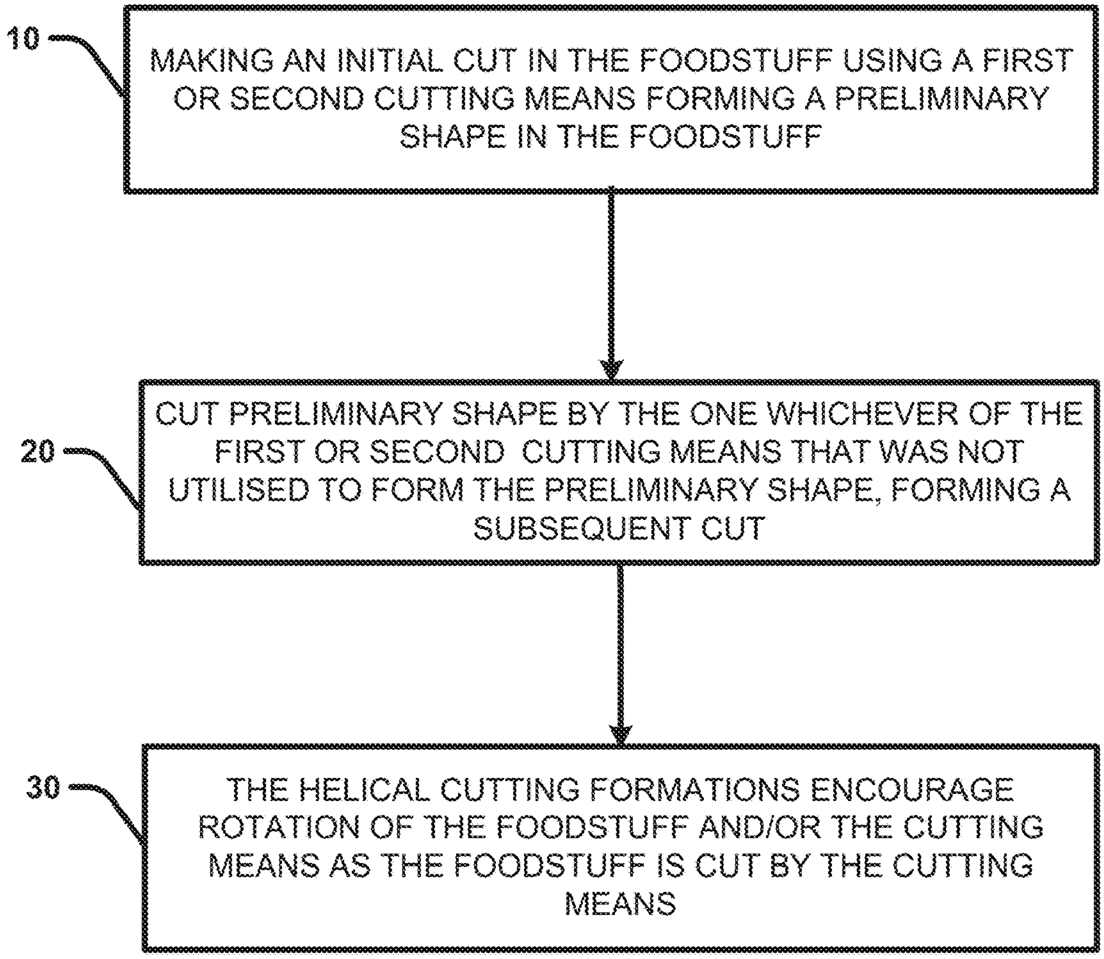
FIG. 27 is a flow diagram illustrating a method described herein.

A method for processing a foodstuff illustrated in FIG. 27 comprises the following steps. 10 Making an initial cut in the foodstuff using a first or second cutting means forming a preliminary shape in the foodstuff, wherein the first cutting means comprises a first central axis and the second cutting means comprises a second cutting axis, and the preliminary shape having comprises a central axis defined by the first central axis if the first cutting means makes the initial cut, or by the second central axis if the second cutting means makes. Wherein the first or second cutting means that makes the initial cut has a cross-sectional shape defining a first maximal external diameter and a first minimal internal diameter about the central axis. 20 The preliminary shape is subsequently cut by the one whichever of the first or second cutting means that was not utilised to form the preliminary shape, forming a subsequent cut, the subsequent cut being in a direction such that the central axis of the preliminary shape aligns with the central axis of the cutting means making the subsequent cut during the cutting operation. Wherein the cutting means making the subsequent cut has a cross-sectional shape defining a second maximal external diameter and a second minimal internal diameter about the central axis. Wherein the initial cut and the subsequent cut are at least partially overlapping cuts. Wherein the first and/or second cutting means comprise a tube shape defined by a wall with a hollow central portion, the respective walls comprising a plurality of helical cutting formations formed around their respective central axis. 30 Wherein the helical cutting formations encourage rotation of the foodstuff and/or the cutting means as the foodstuff is cut by the cutting means. Wherein the direction of a sweep of the helical cutting formations of the first cutting means is oblique in relation to, or opposes, the direction of a sweep of the helical cutting formations of the second cutting means.

The invention claimed is:

1. A method for processing a foodstuff, the method comprising the steps of:

making an initial cut in the foodstuff using an initial cutting means forming a preliminary shape in the foodstuff, wherein the initial cutting means comprises a first central axis, and the preliminary shape comprises a central axis defined by the first central axis; and making a subsequent cut in the foodstuff using a subsequent cutting means to remove material from the preliminary shape, wherein the subsequent cutting means comprises a second central axis, the subsequent cut being in a direction such that the central axis of the preliminary shape aligns with the second central axis;

wherein the initial cutting means has a cross-sectional shape defining a first maximal external diameter and a first minimal internal diameter about the first central axis;

wherein the subsequent cutting means has a cross-sectional shape defining a second maximal external diameter and a second minimal internal diameter about the second central axis, wherein the initial cut and the subsequent cut are at least partially overlapping cuts, wherein the initial cutting means comprises a tube shape defined by a first wall with a hollow central portion and the subsequent cutting means comprises a tube shape defined by a second wall with a hollow central portion, the first wall comprising a plurality of first helical cutting formations formed around the first central axis and the second wall comprising a plurality of second helical cutting formations formed around the second central axis, wherein the first helical cutting formations encourage rotation of the foodstuff and/or the initial cutting means as the foodstuff is cut by the initial cutting means; and/or the second helical cutting formations encourage rotation of the foodstuff and/or the subsequent cutting means as the foodstuff is cut by the subsequent cutting means, and wherein a direction of a sweep of the first helical cutting formations of the initial cutting means is oblique in relation to, or opposes, a direction of a sweep of the helical cutting formations of the subsequent cutting means.

* * * * *